United States Patent Office 3,454,650
Patented July 8, 1969

3,454,650
TERTIARY PHOSPHINE OXIDES
Sheldon Buckler, Lincoln, Mass., and Martin Epstein, Stamford, Conn., assignors to American Cyanamid Company, Stamford, Conn., a corporation of Maine
No Drawing. Continuation-in-part of application Ser. No. 176,776, Mar. 1, 1962. This application May 9, 1966, Ser. No. 548,433
Int. Cl. C07f 9/50
U.S. Cl. 260—606.5      6 Claims

ABSTRACT OF THE DISCLOSURE

Tertiary phosphine oxides of the formula

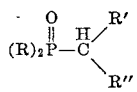

where, typically, R is phenyl, R' is hydrogen, alkyl or phenyl, and R" is alkyl or phenyl. The compounds are useful heavy metal sequestering agents.

---

This application is a continuation-in-part of application Ser. No. 176,776, filed Mar. 1, 1962 and now abandoned.

The present invention relates to tertiary phosphine oxides of the formula

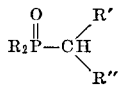

wherein R represents phenyl, para-chlorophenyl, 2-hydroxyethyl-, and

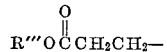

wherein R''' is lower alkyl ($C_1$–$C_8$); R' is hydrogen, alkyl having from 1 to 8 carbon atoms, or phenyl; R" represents alkyl having 1 to 8 carbon atoms, phenyl, para-substituted phenyl, or naphthyl; the sum of R' and R" taken with

of the product formula also represents cyclopentyl, cyclohexyl, or 1-indanyl; provided that when one of R' and R" is phenyl, the other of R' and R" is other than hydrogen.

These products are prepared by the reaction of a weakly basic secondary phosphine of the formula $R_2PH$, which secondary phosphine has a $pK_a$ less than 2, with a ketone or aldehyde of the formula

wherein R' and R" have the meaning hereinabove. Reaction is made to take place in the presence of a concentrated acid, particularly concentrated mineral acid, such as HCl, $H_2SO_4$, HBr, $H_3PO_4$, or the like.

The basicity of the reactant secondary phosphines contemplated herein, i.e., the $pK_a$ values thereof, are determined as reported in the Journal of the American Chemical Society, 82, 5791 (1960).

According to a typical embodiment of the instant discovery diphenylphosphine is reacted with cyclopentanone in the presence of concentrated hydrochloric acid and the corresponding tertiary phosphine oxide prepared as follows:

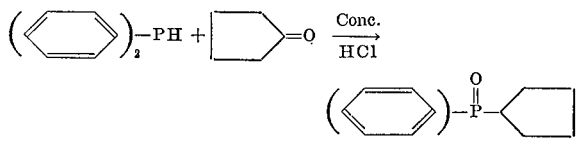

The reactants of the present invention may be brought together in almost any sequence. While stoichiometric amounts of these reactants react to form the products of the present invention, it is not critical or necessary to have stoichiometric amounts present. Any surplus of any reactant with respect to the other may be present without affecting the nature of the reaction. Obviously, too large a surplus is both cumbersome and impractical.

While reaction is generally carried out at room temperature (20° C.–25° C.), temperatures in the range of 0° C. to 150° C. may be employed. In addition, atmospheric, sub-atmospheric or super-atmospheric pressures may be employed without changing the nature of the reaction.

Typical aldehyde and ketone reactants within the purview of the instant invention are cyclopentanone, cyclohexanone, 1-indanone, dimethyl ketone, dibutyl ketone, ethylbutyl ketone, dioctyl ketone, diethyl ketone, dipropyl ketone, dipentyl ketone, dihexyl ketone, diheptyl ketone, acetaldehyde, propionaldehyde, isobutylaldehyde, heptaldehyde, octaldehyde, benzaldehyde, parachlorobenzaldehyde, para-bromobenzaldehyde, para-hydroxybenzaldehyde, para-(lower)alkoxybenzaldehyde, naphthaldehyde, benzophenone, acetophenone and the like.

Typical secondary phosphines which are weakly basic and have a $pK_a$ less than 2 are diphenylphosphine, bis-(2-hydroxyethyl)phosphine, bis(parachlorophenyl)phosphine, and the like.

Further, it has been found according to the present invention that bis(2-cyanoethyl)phosphine, when reacted with the carbonyl compounds contemplated herein, reacts as defined above, yet with one modification:

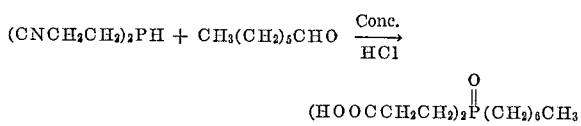

As is evident from this embodiment the —CN moiety of bis(2-cyanoethyl)phosphine is converted to —COOH.

The present invention will best be understood from the following examples which are intended to illustrate and not limit the scope of the invention:

Example I.—Diphenylcyclopentylphosphine oxides

Into a flask purged with nitrogen is placed one part of cyclopentanone dissolved in 50 parts concentrated hydrochloric acid. One part of diphenylphosphine is added thereto and the resulting solution refluxed for two hours. A two layer mixture forms which is diluted with water and extracted with chloroform. Upon evaporating the chloroform from the extracted material a solid residue results. This product residue is then recrystallized from normal hexane and is identified as diphenylcyclopentylphosphine oxide.

Example II.—Diphenylcyclohexylphosphine oxide

Example I is repeated in every essential respect with the exception that cyclohexanone is substituted for cyclopentanone. The corresponding tertiary phosphine oxide, diphenylcyclohexylphosphine oxide, is recovered as taught in Example I.

Example III.—Diphenyl-1-indanylphosphine oxide

Example I is repeated in every essential respect with the exception that cyclopentanone is substituted with 1-indanone.

Examples IV–XXX

In the following table the reactants and reaction conditions of Example I, above, are modified as shown in order to further illustrate the instant discovery:

should be at least a minimum of 10% water in the aqueous acid solution.

Clearly, the instant discovery encompasses numerous modifications within the skill of the art. Consequently, while the present invention has been described in detail with respect to specific embodiments thereof, it is not intended that these details be construed as limitations upon the scope of the invention except insofar as they appear in the appended claims.

TABLE

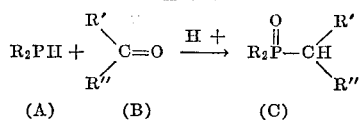

| Example No. | Secondary phosphine (A) | Carbonyl compound (B) | Conc. acid | Molar ratio AA:B | Temp., °C. | Tertiary phosphine oxide (C) |
|---|---|---|---|---|---|---|
| IV | Bis(p-chlorophenyl)phosphine | Octaldehyde | HCl | 1:2 | 120 | Bis(p-chlorophenyl)octylphosphine oxide. |
| V | Bis(2-hydroxyethyl)phosphine | 1-indanone | H₂SO₄ | 2:1 | 80 | Bis(2-hydroxyethyl)-1-indanylphosphine oxide. |
| VI | Bis(2-cyanoethyl)phosphine | Cyclohexanone | H₃PO₄ | 2:1 | 115 | Bis(2-carboxyethyl)cyclohexylphosphine oxide. |
| VII | Diphenylphosphine | Dimethyl ketone | HCl | 5:1 | 30 | Diphenylisopropylphosphine oxide. |
| VIII | Bis(2-carboethoxyethyl)phosphine | Dipropyl ketone | HCl | 1:3 | 5 | Bis(2-carboethoxyethyl)-4-heptylphosphine oxide. |
| IX | Bis(2-carbopropoxyethyl)phosphine | Dioctyl ketone | HBr | 1:1 | 120 | Bis(2-carbopropoxyethyl)-9-heptadecylphosphine oxide. |
| X | Bis(2-carbobutoxyethyl)phosphine | Ethylbutyl ketone | H₂SO₄ | 1:3 | 75 | Bis(2-carbobutoxyethyl)-3-heptyl)phosphine oxide. |
| XI | Bis(2-carbomethoxyethyl)phosphine | Acetaldehyde | HCl | 1:5 | 60 | Bis(2-carbomethoxyethyl)ethylphosphine oxide. |
| XII | Diphenylphosphine | Propionaldehyde | H₂SO₄ | 7:1 | 65 | Diphenylpropylphosphine oxide. |
| XIII | Bis(2-carbomethoxyethyl)phosphine | Benzaldehyde | HCl | 1:1 | 65 | Bis(2-carbomethoxyethyl)benzylphosphine oxide. |
| XIV | Bis(p-chlorophenyl)phosphine | p-Chlorobenzaldehyde | H₃PO₄ | 1:2 | 60 | Bis(p-chlorophenyl)-p-chlorobenzylphosphine oxide. |
| XV | Bis(2-hydroxyethyl)phosphine | p-Bromobenzaldehyde | H₃PO₄ | 2:1 | 30 | Bis(2-hydroxyethyl)-p-bromobenzylphosphine oxide. |
| XVI | Bis(2-cyanoethyl)phosphine | p-Hydroxybenzaldehyde | HCl | 3:1 | 60 | Bis(2-carboxyethyl)-p-hydroxybenzylphosphine oxide. |
| XVII | Diphenylphosphine | p-Ethoxybenzaldehyde | H₂SO₄ | 3:1 | 120 | Diphenyl-p-ethoxybenzylphosphine oxide. |
| XVIII | do | p-Butoxybenzaldehyde | H₂SO₄ | 1:1 | 25 | Diphenyl-p-butoxybenzylphosphine oxide. |
| XIX | Bis(p-chlorophenyl)phosphine | 1-naphthaldehyde | HCl | 1:1 | 130 | Bis(p-chlorophenyl)-1-naphthylmethylenephosphine oxide. |
| XX | Bis(2-hydroxyethyl)phosphine | Benzophenone | HCl | 1:2 | 100 | Bis(2-hydroxyethyl)α-phenylbenzylphosphine oxide. |
| XXI | Diphenylphosphine | Acetophenone | HCl | 1:1 | 90 | Diphenyl(α-methylbenzyl)phosphine oxide. |
| XXII | Bis(cyanoethyl)phosphine | n-Heptaldehyde | HCl | 1:1 | 110 | Bis(2-carboxyethyl)-heptylphosphine oxide. |
| XXIII | Diphenylphosphine | Cyclopentanone | HCl | 1:1 | 120 | Diphenylcyclopentylphosphine oxide. |
| XXIV | do | 1-indanone | HCl | 1:2 | 80 | Diphenyl-1-indanylphosphine oxide. |
| XXV | do | 1-naphthaldehyde | HCl | 1:1 | 100 | Diphenyl-1-naphthylphosphine oxide. |
| XXVI | do | Diethyl ketone | HCl | 1:1 | 120 | Diphenyl-3-pentylphosphine oxide. |
| XXVII | do | Benzaldehyde | HCl | 2:1 | 75 | Diphenylbenzylphosphine oxide. |
| XXVIII | do | Isobutylaldehyde | HCl | 1:1 | 120 | Diphenylisobutylphosphine oxide. |
| XXIX | do | n-Heptylaldehyde | HCl | 1:1 | 120 | Diphenyl-1-heptylphosphine oxide. |
| XXX | do | Acetaldehyde | HCl | 1:2 | 80 | Diphenylethylphosphine oxide. |

The compounds of the present invention are particularly useful as sequestering agents in the selective removal of heavy metal values from mixtures containing ions, such as uranyl. Uranyl values can be selectively leached from an ore containing the same by employing techniques known in the art, as shown by Blake et al. in the Atomic Energy Commission Report ORNL—1903, May 13, 1955.

By concentrated mineral acid herein is intended a strong mineral acid having at least 8 molar concentration of the acid in aqueous solution. While no lower than about 8 molar acid concentration is contemplated herein, there

We claim:
1. A tertiary phosphine oxide of the formula

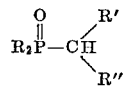

wherein R is phenyl, para-chlorophenyl, or 2-hydroxyethyl; R' is hydrogen, alkyl ($C_1$–$C_8$) or phenyl; R" is alkyl ($C_1$–$C_8$), phenyl, para-substituted phenyl or naphthyl, said substituents for para-substituted phenyl being halogen, hydroxy or lower alkoxy; and the sum of R' and R" taken with

of the product formula also represents cyclopentyl, cyclohexyl or 1-indanyl; provided that when R" is phenyl, R' is other than hydrogen; and provided further that when R is phenyl and R' is hydrogen, R" is para-substituted phenyl or naphthyl and said substituent is hydroxy or lower alkoxy.

2. The tertiary phosphine oxide of claim 1 wherein R is phenyl, and the sum of R' and R" taken with

of the product formula is 1-indanyl.

3. The tertiary phosphine oxide of claim 1 wherein R is 2-hydroxyethyl and each of R' and R" is phenyl.

4. The tertiary phosphine oxide of claim 1 wherein R is phenyl, R' is hydrogen, and R" is para-ethoxyphenyl.

5. The tertiary phosphine oxide of claim 1 wherein R is para-chlorophenyl, R' is hydrogen, and R" is para-chlorophenyl.

6. The tertiary phosphine oxide of claim 1 wherein R is para-chlorophenyl, R' is hydrogen, and R" is naphthyl.

References Cited

UNITED STATES PATENTS 2,864,668   12/1958   Baldwin et al. ___ 260—606.5 XR
3,213,057   11/1965   Ritt et al. _____ 260—606.5 XR

OTHER REFERENCES

Buckler et al.: J.A.C.S., vol. 82 (1960), pp. 2076 to 2077.

Berlin et al.: Chemical Reviews, vol. 6, No. 3 (1960), p. 256.

TOBIAS E. LEVOW, *Primary Examiner.*

W. F. W. BELLAMY, *Assistant Examiner.*

U.S. Cl. X.R.

23—346; 260—429.1

PO-1050
(5/69)

UNITED STATES PATENT OFFICE
CERTIFICATE OF CORRECTION

Patent No. 3,454,650        Dated January 22, 1970

Inventor(s) SHELDON BUCKLER and MARTIN EPSTEIN

It is certified that error appears in the above-identified patent and that said Letters Patent are hereby corrected as shown below:

Column 2, line 7, the formula:

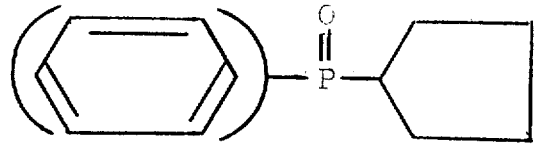

should read:

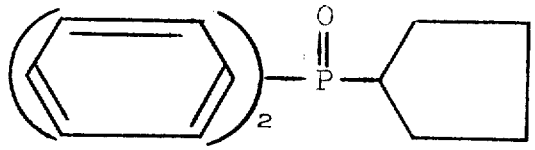

Column 2, line 29-30, cancel "parachlorohenzaldehyde" and substitute therefore --para-chlorobenzaldehyde--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents